United States Patent [19]

Toyono et al.

[11] Patent Number: 4,590,496

[45] Date of Patent: May 20, 1986

[54] IMAGE RECORDING APPARATUS

[75] Inventors: Tsutomu Toyono, Yokohama; Yuji Sakemi, Kawasaki; Haruo Fujii, Yokohama, all of Japan

[73] Assignee: Canon Kabushiki Kaisha, Tokyo, Japan

[21] Appl. No.: 617,609

[22] Filed: Jun. 5, 1984

[30] Foreign Application Priority Data

Jun. 10, 1983 [JP] Japan ................................ 58-104042

[51] Int. Cl.[4] .............................................. G01D 15/06

[52] U.S. Cl. .................................. 346/153.1; 346/155

[58] Field of Search ................ 346/139 C, 155, 153.1; 400/119; 358/301

[56] References Cited

U.S. PATENT DOCUMENTS 4,218,691 8/1980 Fujii ................................ 346/153.1

4,464,672 8/1984 Lindahl ............................ 346/153.1

*Primary Examiner*—E. A. Goldberg

*Assistant Examiner*—A. Evans

*Attorney, Agent, or Firm*—Fitzpatrick, Cella, Harper & Scinto

[57] ABSTRACT

An image recording apparatus includes a recording electrode having an array of electrode elements which are electrically isolated, a recording material opposed to the recording electrode, a mechanism for applying conductive and magnetic toner particles to the surface of the recording material, a magnet for generating a magnetic field across the clearance between the recording electrode and the recording material, a device for applying an image-wise voltage signal between the recording electrode and the recording material and a removing mechanism for removing, by magnetic attraction, excess toner particles which have not been used in the image formation.

8 Claims, 8 Drawing Figures

IMAGE RECORDING APPARATUS

BACKGROUND OF THE INVENTION

This invention relates to an image recording apparatus and, more particularly to an apparatus wherein one-component, conductive and magnetic developer (hereinafter simply called "toner") is imagewisely deposited on a recording material directly in response to electric image signals.

An image recording apparatus of this type has already been proposed, such as in U.S. patent application Ser. No. 22859, which will be briefly described in connection with FIG. 1. As is shown in this figure, the apparatus includes a stationary toner applying roller 1 which is in the form of a cylinder of non-magnetic material and which is dipped in the powder of conductive and magnetic toner T contained in a toner container 3. In the toner applying roller 1, there is a rotatable magnet 2 which is driven by an unshown driving mechanism. A recording electrode assembly 6 includes a number of electrode elements each made of a conductive and magnetic material. The electrode 6 is sandwiched by two opposing magnets 7 constituting magnetic field generating means.

When the magnet 2 rotates in the direction of arrow a, the conductive magnetic toner T moves from the container 3 along the surface of the applying roller 1 in the direction of arrow b and, after being subjected to a regulating function by a doctor blade 3', the toner is conveyed toward a recording material 4. The recording material 4 is shown as consisting of a cylindrical conductive base plate **4*a* and a dielectric layer 4*b* thereon, but is not limited to this type. Commercially available electrostatic recording paper is usable. Between the recording material 4 and the toner applying roller 1 in the illustrated arrangement, a voltage is applied by a power source 5**, so that the toner T is attached on the recording material surface by an electrostatic force to form a thin layer thereof.

The thin coated toner layer T is conveyed, by the rotation of the recording material 4 in the direction of arrow, to the recording electrode 6 comprising a number of arrayed electrode elements which are electrically isolated from each other, whereat the toner particles are erected in the form of chains extending to reach to the tips of the recording electrode 6 under the action of magnetic force of the magnets 7. The contact of the toner with the electrode 6 discharges the charges, having been injected by the applying roller 1, through the chains of the toner particles and the recording electrode 6, so that there is now no attracting force between the recording material 4 and the toner T. At this instance, if an imagewise signal voltage is applied between the recording material 4 and the recording electrode 6 from a signal source 8, electric charges of opposite polarities appear, through the chain of toner particles, in the toner layer on the surface of the insulating layer **4*b* of the recording material 4 on one hand and in the back of the insulating layer 4*b* on the other hand, causing an attracting force to hold a part of the toner particles on the surface of the recording material 4**.

The apparatus further includes a toner removing device 9 which removes by using air suction or the like those toner particles to which no attracting force has been applied, without disturbing the imagewise pattern of the toner particles held on the recording material 4, whereby a visualized image appears on the recording material 4. The thus visualized toner image is transferred to and fixed on a sheet of paper by a conventional corona discharging step, pressure-fixation step and the like. In a case where a commercially available electrostatic recording sheet is used as the recording material 4, the toner image may be directly fixed on the recording material.

Several disadvantages in the apparatus described in the foregoing has been found. The toner removing device 9 needs a bulky mechanism for producing air suction or the like. Further, a large space is required around the recording material. Moreover, those toner particles which can no longer be held on the recording material 4 are liable to be attracted by the force of magnetic field caused by the magnets 7 so that they are deposited on the magnets 7 and on the portion near the magnets. Therefore, during a long period operation, the deposited and accumulated toner particles will reach the recording material 4, soiling it or disturbing image formation.

SUMMARY OF THE INVENTION

It is accordingly an object of the present invention to provide an image recording apparatus having a simple and compact toner removing device which is free from the disadvantages as discussed above.

This object is achieved by an image recording apparatus according to the present invention which includes a toner removing device comprising a magnetic member movable along a recording electrode array and means for removing the toner particles attached by magnetic attraction to the magnetic member, in substitution for the toner removing mechanism using air suction as in the above-mentioned earlier application. The magnetic member of the present invention may be a magnet belt or magnet wire, or otherwise may be a magnetic belt or wire for guiding the magnetic flux of a magnet disposed in proximity thereto.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
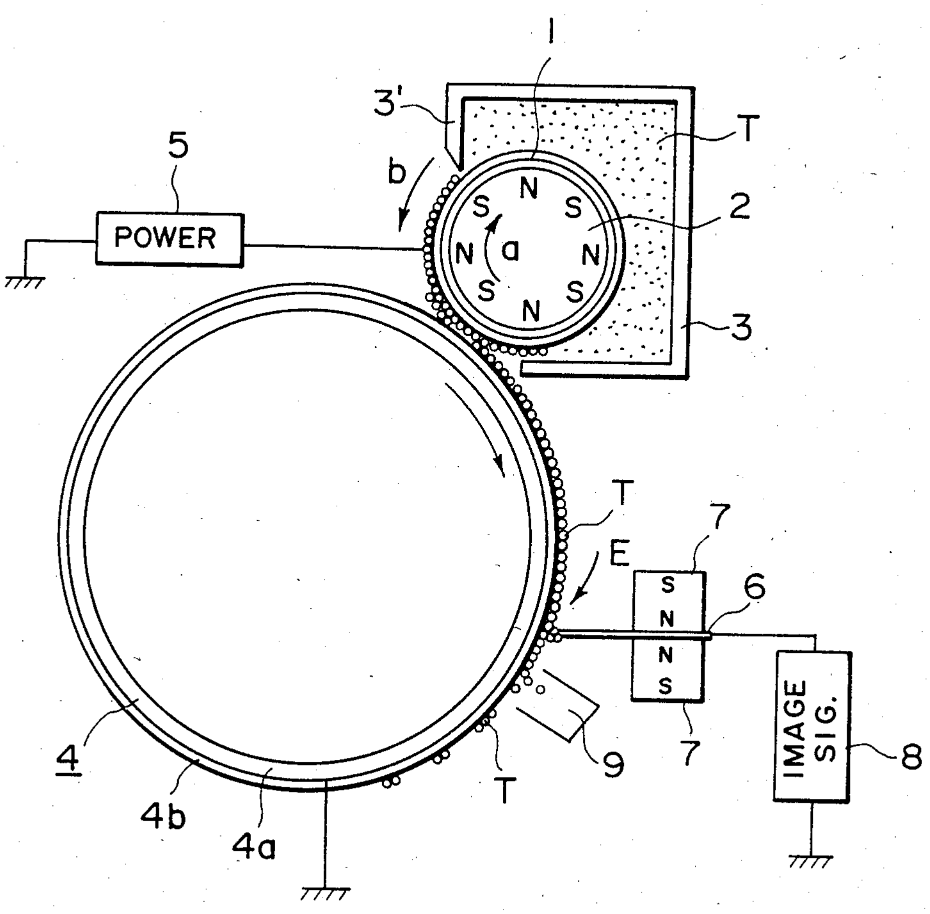
FIG. 1 is a cross-sectional view showing the arrangement of the image recording apparatus such as disclosed in the above-mentioned earlier application.

The invention will now be described in detail with reference to FIGS. 2 to 8. In these figures, the same reference numerals as in FIG. 1 designate elements having functions corresponding to those of the elements shown in FIG. 1.

Figure 2:
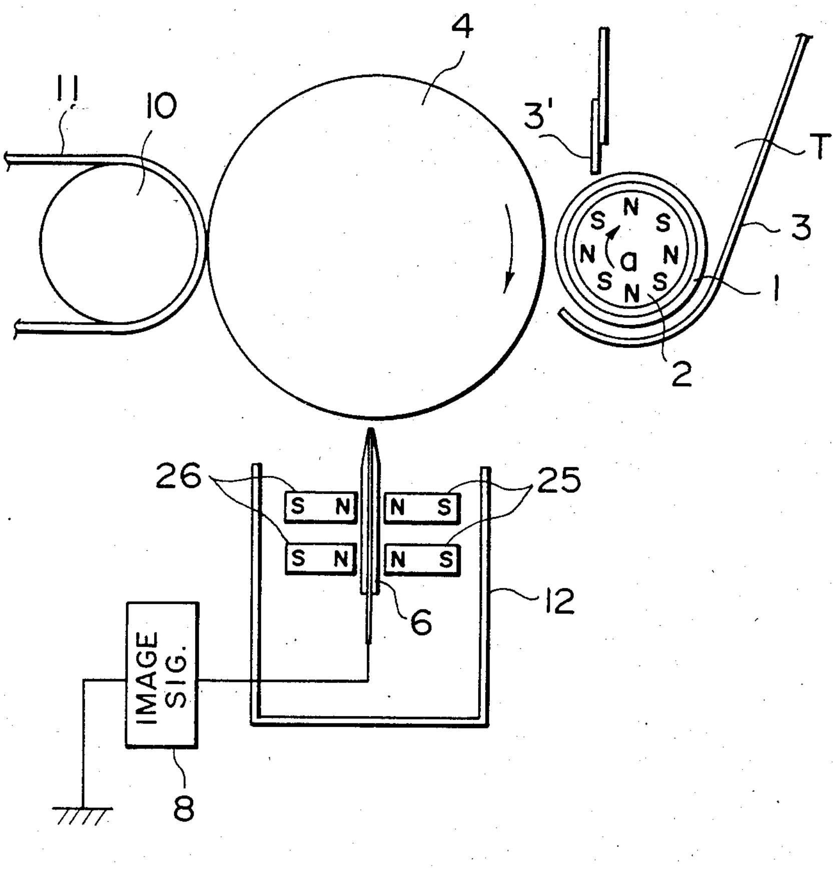
FIG. 2 is a cross-sectional view showing an image recording apparatus according to an embodiment of the present invention.

In the cross-sectional view of FIG. 2, a recording material 4 has substantially the same structure as that shown in FIG. 1 and comprises a conductive base member 4a in a form of, e.g., an aluminium cylinder of the 100 mm diameter, and an insulating layer 4b of alumite of 2μ thickness formed on the surface of the base member 4a. The recording material 4 is rotatable in the direction of the arrow. A stationary toner applying roller 1 is made of a non-magnetic material and has disposed therein a magnet 2 rotatable in the direction of arrow a. The toner (conductive and magnetic toner) may have a volume resistivity not more than $10^{10}$ Ωcm. In the illustrated embodiment, the toner comprised imaging powder TYPE 355 available from 3M to which carbon was added to realize the volume resistivity of $10^5$ Ωcm. A recording electrode 6 comprised three thousand, three hundred and sixty (3360) needles of pure iron each having 20μ diameter. The needles were disposed in parallel to each other within a width of 210 mm. The electrode elements were fixed together by an adhesive agent Cemedine Super, a trade name, manufactured by Cemedine Corporation. The electrode 6 is opposed to the recording material 4 in a substantially right-angle relation relative thereto with a clearance of 75±25μ being maintained between the tip end of the electrode 6 and the recording material 4. The recording material 4 is rotatable at a linear speed the of 200 mm/sec. in the direction of arrow. An imagewise signal source 8 supplies a signal voltage of about 30 V to the recording electrode in accordance with the image pattern. The conductive and magnetic toner T is contained in a toner container 3 and is conveyed by the toner applying roller 1 to the recording material 4. Thereafter, in response to the voltage signal applied from the signal source 8 to the recording electrode 6, a part of the toner obtains a force to adhere to the recording material 4 corresponding to the image pattern, while the remaining part of the toner loses such force, as has been described with reference to FIG. 1. Such excess toner is magnetically attracted by magnet belts 25 and 26 disposed on the opposite sides of the recording electrode array 6 and is deposited on the belts. These magnet belts 25 and 26 also act as the magnets 7 shown in FIG. 1, and have the same polarities on the sides facing the recording electrode 6. These magnet belts are adapted to produce a magnetic flux density of about 1100 gauss at the tip end of the recording electrode 6. The image thus formed on the recording material 4 is pressed, as required, by a pressure roller 10 to be transferred to a transfer member 11, and is made into a permanent image by an unshown fixing means.

Figure 3:
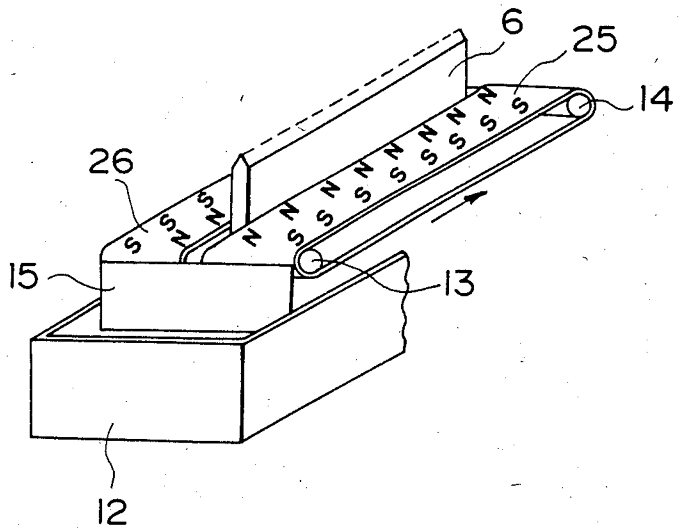
FIG. 3 is a fragmentary perspective view of the apparatus shown in FIG. 2.

FIG. 3 is a perspective view showing the recording electrode array 6 and the elements adjacent thereto as illustrated in FIG. 2. The excess toner which has not been used in the image formation at the position of the recording electrode 6 is attracted from the recording material 4 to the magnet belts 25 and 26. These magnet belts are movable in the direction of the arrow around rotational shafts 13 and 14. A scraper 15 is adapted to scrape the magnetic toner particles off the magnet belts at their turning points, and the scraped toner particles are collected in a toner container 12. If necessary, means may be provided to put the toner particles in the container 12 back to the toner container 3. Each of the recording electrode elements 6 is made of a conductive and magnetic material, and is adapted to ensure satisfactory erecting of chains of toner particles at the tip end of the recording electrode array 6 facing the recording material 4 under the action of the magnetic force of the magnets 25 and 26 so that the electric resistance of each chain of the toner particles is reduced to thereby assure that a good image is formed with a reduced voltage and that any voltage signal leakage between adjacent recording electrode elements is prevented. In order to positively achieve the above, the polarity arrangement of the magnet belts 25 and 26 are preferably such that the magnet belts have the same polarity (N-polarity in the illustrated embodiment) on the sides facing the recording electrode 6. With this arrangement, the concentration of the magnetic force onto each recording electrode element 6 is improved, whereby satisfactorily erected chains of toner particles are formed between the tip of the recording electrode and the recording material 4.

The toner particles may enter into the inside of the magnet belts 25 and 26 and offset belt movement or the like. In order to prevent this, it is preferable to provide a cleaning member made of a spongy material or the like between the recording electrode array 6 and the magnet belts 25, 26 and/or between the magnet belts and the toner container 12, or cleaning means such as a scraper for scraping the inner surfaces of the magnet belts 25 and 26.

Figure 4:
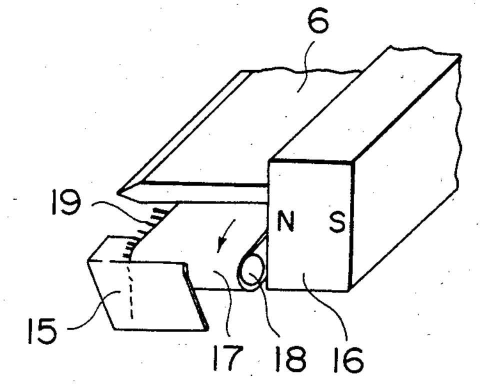
FIG. 4 is a fragmentary perspective view showing another embodiment of the present invention.

FIG. 4 is a perspective view showing another embodiment of the present invention. In this embodiment, a stationary magnet 16 is provided at the back of the recording electrode array 6 and a belt 17 made of a magnetic material is disposed at least on one side of the recording electrode array. The magnetic belt 17 is movable in the direction of arrow with the rotating force of a rotational shaft 18. Since the magnetic force of the magnet 16 is concentrated on the magnetic belt 17, the excess toner particles on the recording material 4 are removed therefrom and deposited on the magnetic belt 17 to form thereon chains of toner particles 19. The chains of excess toner particles are moved with the movement of the magnetic belt 17 and are scraped off by a scraper 15. The belt 17 may of course be a magnet.

Figure 5:
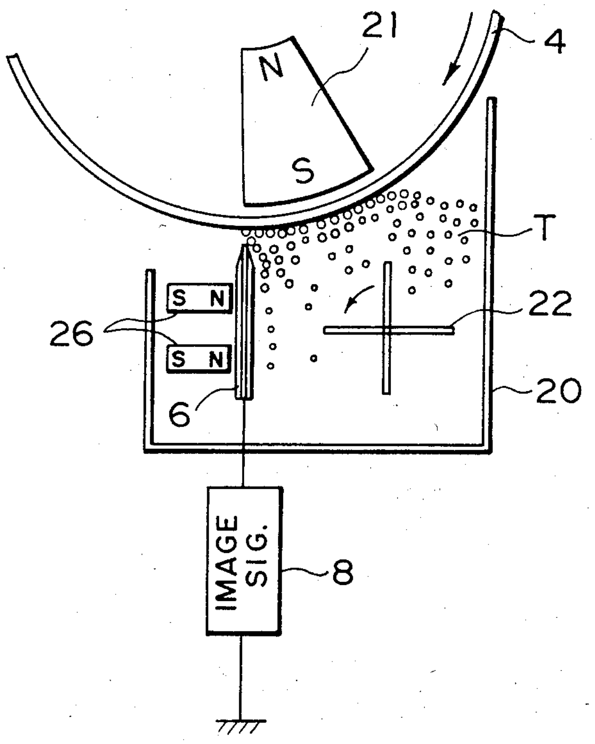
FIG. 5 is a fragmentary cross-sectional view showing still another embodiment of the present invention.

FIG. 5 is a cross-sectional view showing still another embodiment of the present invention. In this embodiment, a stationary magnet 21 is disposed at the inside of the recording material 4 and in opposition to the recording electrode 6. The toner particles contained in a toner container 20 are supplied by a stirring element 22 to the recording material 4 opposite to the magnet 21. Upon application of an imagewise voltage signal from the image signal source 8 to the recording electrode 6, an image is formed in the manner as described hereinbefore. The excess toner particles are collected by magnet belts 26 similar to that shown in FIG. 3, and fall into a toner container to be reused.

Figure 6:
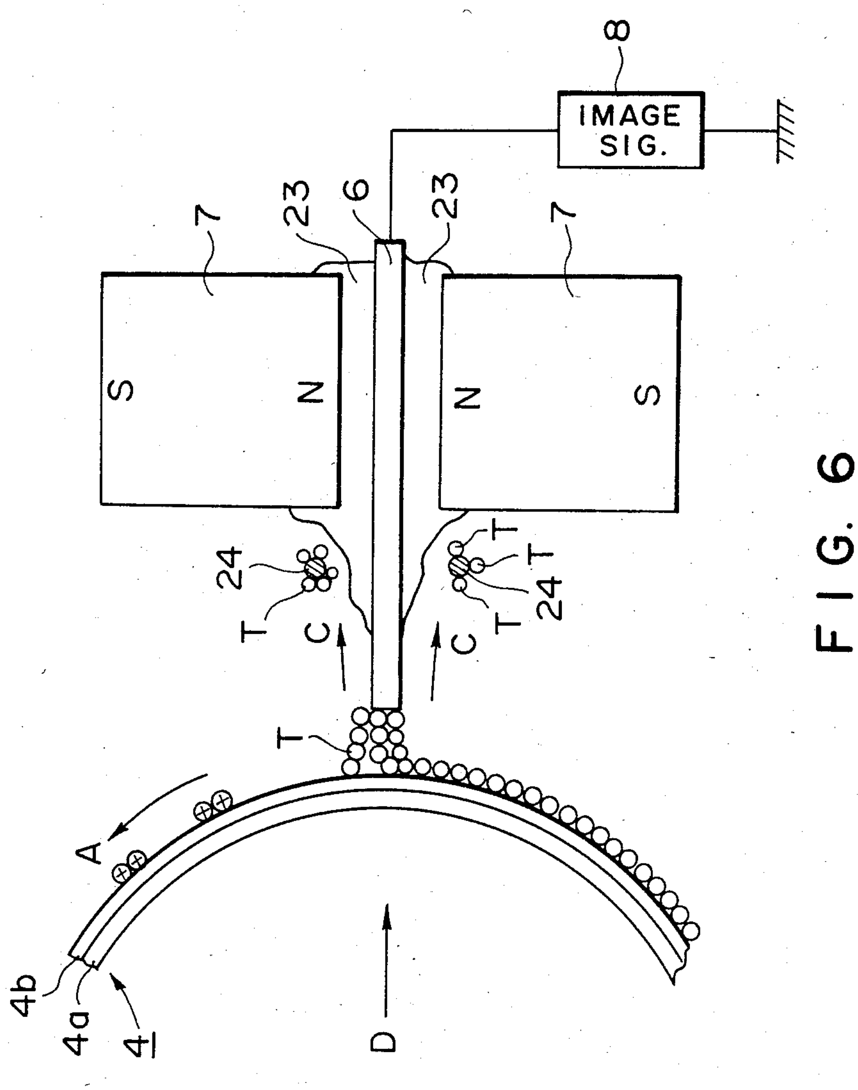
FIG. 6 is a side view showing a further embodiment of the present invention.
Figure 7:
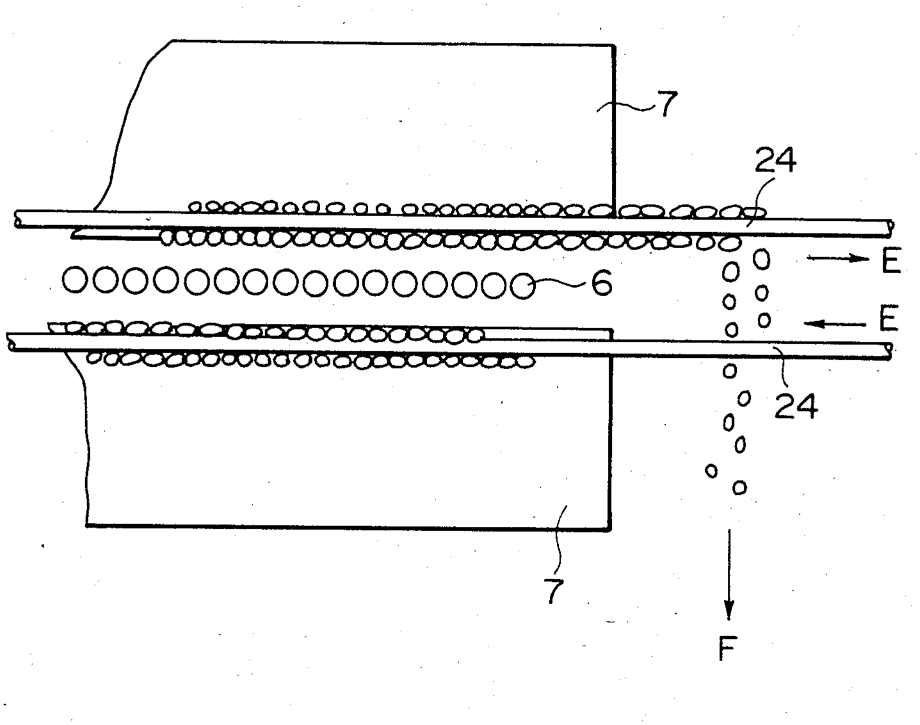
FIG. 7 is a front view showing the embodiment as illustrated in FIG. 6.

FIG. 6 is a side view illustrating a further embodiment of the present invention and FIG. 7 is an illustration showing the recording electrode 6, magnets 7 and other elements juxtaposed thereto as viewed in the direction D in FIG. 6. An adhesive agent 23 is provided to adhesively fix the recording electrode elements 6 together and to secure the electrode assembly to the magnets 7. The present embodiment corresponds to FIG. 4 embodiment except that magnetic wires 24 are used in place of the magnetic belt 17 in FIG. 4. Each magnetic wire 24 is made of iron and is extended transversely in front of the magnets 7, the wire being movable in the direction of arrow E. The excess toner particles T which have not been used in the image formation on the recording material 4 and which have lost the attaching force are attracted by the magnetic fields of the magnets 7 in the direction of arrow C in FIG. 6 and are deposited by magnetic attraction on the magnetic wires 24. As the wires 24 move in the direction E, the toner particles deposited thereon become free from the bondage by the magnetic fields of the magnets 7 and fall down away from the wires 24 in the direction of arrow F. Where an unshown conveyance screw or shoot is used to put the toner particles back to the toner container, collection of toner particles for the purpose of reuse thereof is permitted. With the above-described arrangement, unwanted deposition of excess toner particles on the magnets 7 and/or the recording electrode 6 is prevented so that the otherwise caused disadvantages such as disturbance to the image recording operation, spoiling the recording material and the like are precluded. The wire 24 may be course be a magnet.

Figure 8:
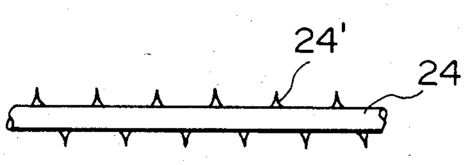
FIG. 8 shows another form of a toner collecting wire.

FIG. 8 shows a still further embodiment wherein the wire 24 in the preceding embodiment is modified to have spikes 24' to improve the attraction and collection of the toner particles.

In accordance with the present invention, as has hitherto been described, a compact toner removing device is ensured which immediately removes the excess toner on the recording material and which can be disposed within a minute space arond the recording electrode. Therefore, the present invention is in fact effective to realize a simple and compact image recording apparatus of the above-specified type.

While the invention has been described with reference to the structures disclosed herein, it is not confined to the details set forth and this application is intended to cover such modifications or changes as may come within the scope of the present invention, which is defined solely by the following claims.

What is claimed is:

1. An image recording apparatus, comprising:
 a recording electrode having an array of electrically isolated electrode elements;
 a recording material having a surface opposed to said recording electrode;
 means for applying conductive and magnetic toner particles to said surface of said recording material to form an image thereon;
 magnetic field generating means for applying a magnetic field across the clearance between said recording material and said recording electrode, said magnetic field generating means being disposed adjacent said recording electrode;
 means for applying an imagewise voltage signal between said recording electrode and said recording material; and
 toner removing means for removing by magnetic attraction excess toner particles not used in image formation, said toner removing means being disposed adjacent said recording electrode and between said recording material and said magnetic field generating means, wherein said toner removing means includes a magnetized member of magnetic material movable along said array of said electrode elements and said magnetized member is magnetized by the magnetic force of said magnetic field generating means for attracting excess toner particles.

2. An image recording apparatus according to claim 1, wherein said toner removing means includes a magnetic belt.

3. An image recording apparatus according to claim 1, wherein said toner removing means includes a magnetic wire.

4. An image recording apparatus according to claim 1, wherein said toner removing means includes a magnetic wire having a spike.

5. An image recording apparatus, comprising:
 a recording electrode having an array of electrically isolated electrode elements;
 a recording material having a surface opposed to said recording electrode;
 means for applying conductive and magnetic toner particles to said surface of said recording material for forming an image thereon;
 means for applying an imagewise voltage signal between said recording electrode and said recording material;
 magnet means for applying a magnetic field across the clearance between said recording material and said recording electrode to attract the toner particles to a free end of said recording electrode to effect image formation and for removing by magnetic attraction excess toner particles not used in image formation, wherein said magnet means is disposed adjacent said recording electrode for movement along said array of electrode elements; and
 means for removing the toner particles deposited on said magnet means.

6. An image recording apparatus according to claim 5, wherein said magnet means includes at least one magnet belt.

7. An image recording apparatus according to claim 5, wherein said magnet means includes first and second magnet belts interposing therebetween said recording electrode.

8. An image recording apparatus according to claim 7, wherein said first and second magnet belts have magnetic poles of the same polarity at their sides near said recording electrode.

* * * * *